United States Patent [19]

Phillips

[11] 4,228,057
[45] Oct. 14, 1980

[54] GROUTING COMPOSITION CONTAINING ACRYLATE SALTS OF IRON

[75] Inventor: Kenneth G. Phillips, River Forest, Ill.

[73] Assignee: Nalco Chemical Company, Oak Brook, Ill.

[21] Appl. No.: 19,998

[22] Filed: Mar. 12, 1979

[51] Int. Cl.³ .................. C08F 230/04; C08F 4/30; C08F 30/04; C08F 222/02
[52] U.S. Cl. ................. 260/29.6 TA; 260/42.12; 526/229; 526/241
[58] Field of Search ............. 526/241; 260/42.12, 260/29.6 TA, 29.6 T

[56] References Cited

U.S. PATENT DOCUMENTS

| | | | |
|---|---|---|---|
| 2,651,619 | 1/1951 | Mello et al. | 260/42.12 |
| 2,801,984 | 8/1957 | Morgan et al. | 260/42.12 |
| 2,856,380 | 10/1958 | Roth et al. | 260/42.12 |
| 3,021,298 | 2/1962 | Rakowitz | 260/42.12 |
| 3,056,757 | 10/1962 | Rakowitz | 260/42.12 |
| 3,286,475 | 11/1966 | Adams | 260/42.12 |

FOREIGN PATENT DOCUMENTS 710894 7/1968 Belgium .

OTHER PUBLICATIONS

Derwent Abs. No. 710894 Belgium.

Primary Examiner—Joseph L. Schofer
Assistant Examiner—Herbert J. Lilling
Attorney, Agent, or Firm—John G. Premo; Robert A. Miller

[57] ABSTRACT

An aqueous solution of
(a) acrylic acid;
(b) an iron acrylate from the group consisting of ferrous or ferric acrylates;
(c) methylene bis acrylamide; and
(d) a water-soluble polymerization catalyst which also is a reducing agent when the iron acrylate is ferric acrylate and an oxidizing agent when the iron acrylate is ferrous acrylate;

with the ratio of (a) to (b) being between 10:0.1 to 10:1.5, which solution forms a water resistant gel.

1 Claim, No Drawings

GROUTING COMPOSITION CONTAINING ACRYLATE SALTS OF IRON

INTRODUCTION

It is now known that soil can be stabilized by treating it with aqueous solutions which contain methylene-bis-acrylamide and water-soluble vinyl monomers such as acrylamide and water-soluble salts of acrylic acid, particularly sodium acrylate. These solutions are polymerized in the presence of a suitable catalyst to form water-insoluble gels which consolidate and firm up the soil. The various soil stabilization applications as well as the methylene-bis-acrylamide solutions and gels formed therefrom are described in U.S. Pat. No. 2,801,984, the disclosure of which is incorporated herein by reference.

Commercially, grouting is accomplished using methylene-bis-acrylamide with acrylamide. Soils treated with solutions of these two monomers which are subsequently polymerized in contact with the soil produce dense, friable masses of soil which can be chipped or broken. When sodium acrylate is substituted for acrylamide in making these gels, the resultant gels tend to become less rigid as they are exposed to moisture, thus rendering their usability limited in treating soils.

THE INVENTION

This invention comprises an aqueous solution of
(a) acrylic acid;
(b) an iron acrylate from the group consisting of ferrous or ferric acrylates;
(c) methylene bis acrylamide; and
(d) a water-soluble polymerization catalyst which also is a reducing agent when the iron acrylate is ferric acrylate and an oxidizing agent when the iron acrylate is ferrous acrylate;
with the ratio of (a) to (b) being between 10:0.1 to 10:1.5, which solution forms a water-resistant gel.

The concentration of the above ingredients in water used to produce the gels of the invention may vary although approximately 10% acrylic acid, 0.1 up to about 1.5% iron acrylate, and about 1% methylene bis acrylamide give optimum results. Slightly lower or greater dosages may be used. The soils treated with these solutions and gelled are resilient and have a different character than the methylene bis acrylamide treated soils.

As indicated, one of the most interesting and unique features of the invention is that when ferrous acrylate is used, it is necessary to utilize a water-soluble polymerization catalyst which is also an oxidizing agent. A useful material for this purpose is sodium persulfate. Other persulfates such as ammonium or potassium persulfate may be used. When the iron acrylate is ferric acrylate, a polymerization catalyst which also is a reducing agent should be used such as sodium or ammonium bisulfate.

EXAMPLES

To illustrate the invention, the following are presented by way of examples. In the Table set forth below, the penetration values were obtained using a standard grease penetrometer. Any value below 250 and, preferably, below 200, is considered acceptable.

It should be particularly noted that very little water is picked up by the gels based on percent by weight increase after standing in water for prolonged periods of time. This is surprising since most acrylate-methylene bis acrylamide gels pick up substantial quantities of water under the test conditions used in the Table.

TABLE I

| Acrylic Acid % | Acrylate Salt % | Methylene bis Acrylamide | Catalyst | Water % | Set Time (sec) | Penetration | Water Pick-Up (% Increase) | | |
|---|---|---|---|---|---|---|---|---|---|
| | | | | | | | 24 hrs. | 120 hrs. | 240 hrs. |
| 10 | 0.2 $Fe^{3+}$ | 1.0 | R | 88.8 | 10 | 175 | 3.4 | 18 | — |
| 10 | 0.4 $Fe^{3+}$ | 1.0 | R | 88.6 | 10 | 170 | 3.7 | 13 | — |
| 10 | 0.6 $Fe^{3+}$ | 1.0 | R | 88.4 | 10 | 160 | 4.1 | 18 | — |
| 10 | 0.8 $Fe^{3+}$ | 1.0 | R | 88.2 | 20 | 150 | 4.1 | 17 | — |
| 10 | 1.0 $Fe^{3+}$ | 1.0 | R | 88.0 | 25 | 140 | 4.3 | 18 | — |
| 10 | 0.1 $Fe^{2+}$ | 1.0 | $O_2$ | 88.9 | <10 | 190 | 2.4 | — | 18 |
| 10 | 0.2 $Fe^{2+}$ | 1.0 | $O_2$ | 88.8 | <10 | 170 | 2.6 | — | 20 |
| 10 | 0.3 $Fe^{2+}$ | 1.0 | $O_2$ | 88.7 | <10 | 160 | 3.6 | — | 26 |
| 10 | 0.4 $Fe^{2+}$ | 1.0 | $O_2$ | 88.6 | <5 | 160 | — | — | — |
| 10 | 0.5 $Fe^{2+}$ | 1.0 | $O_2$ | 88.5 | <10 | 160 | 4.0 | — | 12 |

$O_2$ = 5% $(NH_4)_2S_2O_8$
R = .5% $NaHSO_3$ b.o. total solution

I claim:
1. An aqueous solution of
   (a) acrylic acid;
   (b) an iron acrylate from the group consisting of ferrous or ferric acrylates;
   (c) methylene bis acrylamide; and
   (d) a water-soluble polymerization catalyst which also is a reducing agent when the iron acrylate is ferric acrylate and an oxidizing agent when the iron acrylate is ferrous acrylate;
with the ratio of (a) to (b) being between 10:0.1 to 10:1.5, which solution forms a water-resistant gel.

* * * * *